(12) United States Patent
McConville et al.

(10) Patent No.: US 10,132,932 B1
(45) Date of Patent: Nov. 20, 2018

(54) GEO-FENCING SYSTEMS AND METHODS FOR AERIAL VEHICLES

(71) Applicant: Horizon Hobby, LLC, Champaign, IL (US)

(72) Inventors: Michael McConville, Champaign, IL (US); Chris Huhn, Champaign, IL (US)

(73) Assignee: Horizon Hobby, LLC, Champaign, IL (US)

( * ) Notice: Subject to any disclaimer, the term of this patent is extended or adjusted under 35 U.S.C. 154(b) by 0 days.

(21) Appl. No.: 14/927,913

(22) Filed: Oct. 30, 2015

Related U.S. Application Data

(60) Provisional application No. 62/184,840, filed on Jun. 25, 2015.

(51) Int. Cl.
| | |
|---|---|
| *G01S 19/51* | (2010.01) |
| *G01C 21/16* | (2006.01) |
| *G05D 1/10* | (2006.01) |
| *H04W 4/021* | (2018.01) |
| *G01C 21/18* | (2006.01) |

(52) U.S. Cl.
CPC ............ *G01S 19/51* (2013.01); *G01C 21/165* (2013.01); *G01C 21/18* (2013.01); *G05D 1/101* (2013.01); *H04W 4/021* (2013.01)

(58) Field of Classification Search
CPC ...... G01S 19/51; G01C 21/165; G05D 1/101; H04W 4/021
See application file for complete search history.

(56) References Cited

U.S. PATENT DOCUMENTS

| | | | | |
|---|---|---|---|---|
| 2014/0032034 | A1* | 1/2014 | Raptopoulos | G08G 5/0069 701/25 |
| 2015/0253430 | A1* | 9/2015 | Beyon | G01S 17/95 356/28.5 |

\* cited by examiner

*Primary Examiner* — Basil T. Jos
(74) *Attorney, Agent, or Firm* — Baker Botts L.L.P.

(57) ABSTRACT

Example embodiments include an aerial vehicle configured to establish a geo-fence. In particular, an aerial vehicle may include an inertial measurement unit, a GPS sensor, and vehicle controller circuitry that works together to establish a geo-fence based on an initial location. In an example embodiment, the aerial vehicle may establish a rectangular geo-fence and a wind direction based on received angular data, acceleration data, and location data. The rectangular geo-fence may include a minimum fence height, a maximum fence height, a fence length, and a fence width.

19 Claims, 4 Drawing Sheets

GEO-FENCING SYSTEMS AND METHODS FOR AERIAL VEHICLES

BACKGROUND

Unmanned vehicular systems may be used for applications involving transportation, imaging, agriculture, industrial inspection, hobby, and emergency aid, among others. As unmanned systems become increasingly prevalent, the need for systems capable of safe operation becomes apparent. Therefore, a demand for vehicular systems has helped open up a field of innovation in unmanned vehicle control and sensing techniques, as well as component design and assembly.

SUMMARY

Some embodiments of the disclosed systems and methods include an aerial vehicle capable of establishing a geo-fence without requiring a user to pre-configure a geo-fence with separate software and pre-saved maps. A geo-fence is a virtual barrier for a real-world geographic area. For example, some vehicles rely on flight control software that requires a user to download maps of the anticipated geographic flying area. The user must use these maps to pre-configure the geo-fence characteristics. One drawback of such systems is that an aerial vehicle cannot create a geo-fence while out in the field if a map has not been previously saved and geo-fence parameters have not been previously input. Further, some vehicles rely on sensors, such as wind speed sensors, to establish a wind speed direction. One drawback of using additional sensors is additional cost and weight.

In part to overcome these and other drawbacks, embodiments of the disclosed systems and methods include, e.g., establishing a rectangular geo-fence based on an initial location, angular data, and/or acceleration data, without needing the use of pre-loaded maps, Global Position System (GPS) waypoints, or pre-configuration by a user, among others and as described in more detail herein. In operation, the establishment of the geo-fence may be performed by an aerial vehicle, a transmitter (or controller) configured to control the aerial vehicle, or perhaps a combination of the vehicle and its transmitter/controller.

Some embodiments disclosed herein include an aerial vehicle comprising an inertial measurement unit (IMU). The IMU comprises at least one gyroscope sensor configured to output angular data and at least one accelerometer sensor configured to output acceleration data. In some embodiments, the aerial vehicle may further comprise a global positioning system (GPS) sensor configured to output location data (e.g., latitude, longitude, altitude, and perhaps other location data). In some embodiments, the aerial vehicle may still further comprise vehicle controller circuitry electrically connected to the IMU and the GPS sensor. In operation, the vehicle controller circuitry is configured to: (i) receive the angular data, the acceleration data from the IMU, (ii) receive the location data from the GPS sensor, (iii) determine an initial location based on received location data, and (iv) establish a geo-fence based on the initial location.

In addition, some embodiments disclosed herein include methods of operating an aerial vehicle comprising vehicle control circuitry, wherein the methods comprises the vehicle control circuitry of the aerial vehicle (i) receiving location data from a GPS sensor of the aerial vehicle, (ii) receiving angular data and acceleration data from an IMU of the aerial vehicle, (iii) establishing an initial location based on the received location data, and (iv) establishing a geo-fence for the aerial vehicle, where the geo-fence is defined by one or more geo-fence parameters. In operation, the geo-fence parameters include one or more of (i) a minimum fence height, (ii) a maximum fence height, (iii) a fence width, and (iv) a fence length. For example, in some embodiments, the geo-fence may include a minimum and maximum fence height, but no particular fence width or length. In other embodiments, the geo-fence may include a fence width and length, but no minimum or maximum fence height. In still further embodiment, the geo-fence may include a fence width, a fence length, and maximum fence height, but no minimum fence height. Other combinations of maximum and minimum fence height, fence width, and fence length are possible as well. Some embodiments of the methods disclosed herein may further comprise the vehicle controller circuitry determining a wind direction based on received location data and either the received angular data or the received acceleration data.

These as well as other aspects, advantages, and alternatives will become apparent to those of ordinary skill in the art by reading the following detailed description, with reference where appropriate to the accompanying drawings.

DETAILED DESCRIPTION

Example methods and systems are described herein. It should be understood that the words "example," "exemplary," and "illustrative" are used herein to mean "serving as an example, instance, or illustration." Any implementation or feature described herein as being an "example," being "exemplary," or being "illustrative" is not necessarily to be construed as preferred or advantageous over other implementations or features. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

According to various implementations, described herein are systems and methods for geo-fencing for unmanned aerial vehicles. An aerial vehicle configured according to some example embodiments may include one or more inertial measurement unit(s) (IMUs) and one or more global positioning system (GPS) sensor(s). In operation, the aerial vehicle (alone or in combination perhaps with a transmitter or controller configured to control the aerial vehicle) is configured to establish a geo-fence, e.g., a rectangular (or perhaps other shaped) geo-fence, based on data received from the inertial measurement unit(s) and/or the global positioning system sensor(s). In some embodiments, an inertial measurement unit is used to measure rotation and acceleration around one or more axes (e.g., rotation around a pitch, roll, or yaw axis) of the aerial vehicle.

II. Illustrative Systems

Figure 1:
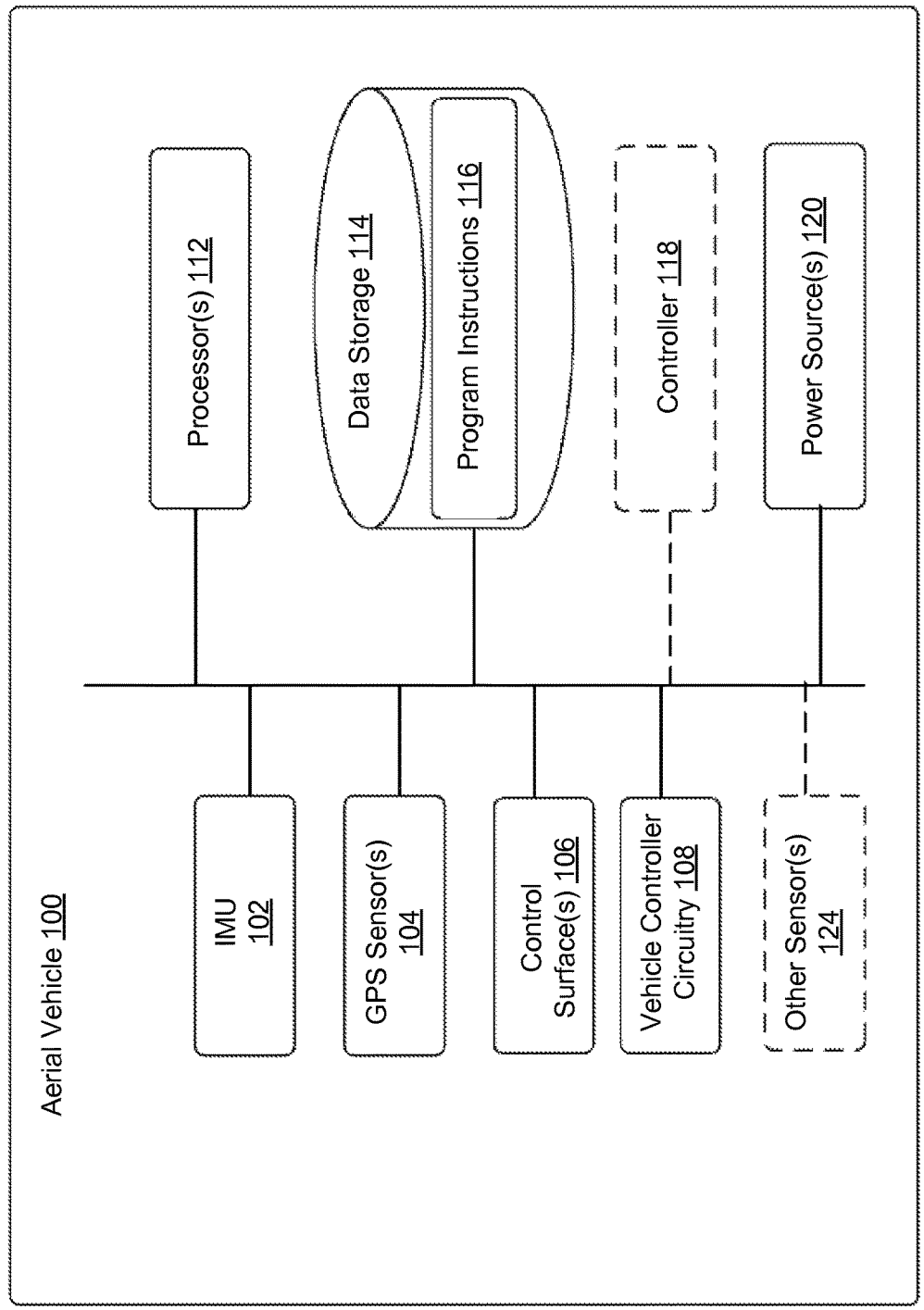
FIG. 1 is a block diagram showing components of an example aerial vehicle 100 according to some embodiments.

FIG. 1 is a block diagram showing components of an example aerial vehicle 100 according to some embodiments. The example aerial vehicle 100 includes an inertial measurement unit ("IMU") 102, one or more global positioning system ("GPS") sensors 104, one or more control surfaces 106 (e.g., ailerons, flaps, flaperons, spoilers, spoilerons, elevators, elevons, stabilators, tailerons, and/or other types of aircraft control surfaces now known or later developed), vehicle controller circuitry 108, one or more processor(s) 112, data storage 114, program instructions 116, one or more controller(s) 118, power source(s) 120, and other sensors 124. Note that the components of the aerial vehicle 100 are shown for illustration purposes only. Some embodiments may include additional components and/or have one or more components removed and still practice and/or employ the geo-fence features and functions disclosed and described herein. Further, note that the various components of the example aerial vehicle 100 may be communicatively coupled or otherwise in communication with each other in any manner now known or later developed that enables the components to operate as a system to perform the functionality disclosed and described herein.

Inertial measurement unit 102 may include one or more gyroscopes, accelerometers, and/or magnetometers to sense the orientation, velocity, and/or gravitational forces.

GPS sensor(s) 104 calculate geographical location data by receiving information from GPS satellites. Although GPS sensor 104 is described herein as a separate component, IMU 102 and GPS sensor 104 may be integrated into a single IMU/GPS sensor. GPS sensor(s) 104 may also be referred to as GPS receivers.

Control surfaces 106 may differ between aerial vehicles and are used to control the aerial vehicle while in operation. Control surfaces 106 may include, e.g., elevators, ailerons, swashplates, rudders, landing gear, flaps, flaperons, spoilers, spoilerons, elevons, stabilators, tailerons, and/or other types of aircraft control surfaces now known or later developed.

The vehicle controller circuitry 108 may comprise multiple sensors and controllers that are configured to control the operation of the aerial vehicle 100. In some embodiments, the vehicle control circuitry 108 is distributed among (and integrated with) other circuitry and/or components of the aerial vehicle 100, e.g., the one or more processors 112, other sensors 124, servomotors (not shown) configured to control the control surfaces 106, radio-frequency (RF) receiver modules (not shown), flight stabilization system(s) (not shown), or other circuitry or components of the aerial vehicle 100. In some embodiments, the vehicle controller circuitry 108 is configured to communicate with controller 118 (e.g., via a digital spread spectrum RF link).

Controller 118 is separate from the aerial vehicle and is configured to enable a pilot or operator to remotely control the aerial vehicle over an RF link between the controller 118 and the aerial vehicle 100. The controller 118 may also be referred to as a transmitter. In some embodiments, the controller 118 may be a hand-held controller comprising hardware, software, and radio communications circuitry. In other embodiments, the controller 118 may be a computing device (e.g., a smartphone, tablet, laptop or desktop computer, or other type of computing device) loaded with software that, when executed by the computing device, enables a pilot or operator to use the controller 118 to control the aerial vehicle 100 and/or to perform at least some of the features and functions described herein.

The one or more processors 112 may include general-purpose processor(s) or special purpose processor(s) (e.g., digital signal processors, application specific integrated circuits, etc.). The processor(s) 112 can be configured to execute computer-readable program instructions 116 that are stored in the data storage 114 and are executable to cause the aerial vehicle 100 to perform at least some of the functions and features described herein. For instance, the program instructions 116 may be executable to provide functionality of the vehicle controller circuitry 108, where the vehicle controller 108 may be configured to instruct (via one or more control signals) one or more servomotors (not shown), for example, by sending one or more control signals to the one or more servomotors configured to control the one or more control surfaces 106 to cause movement of one or more control surfaces 106, thereby controlling the flight of the aerial vehicle 100. Processor(s) 112, data storage 114, and computer-readable program instructions 116 may be integrated within other components, such as vehicle controller circuitry 108 and vice versa.

The data storage 114 may include or take the form of one or more computer-readable storage media that can be read or accessed by the processor(s) 112. The one or more computer-readable storage media can include volatile and/or non-volatile storage components, such as optical, magnetic, organic or other memory or disc storage, which can be integrated in whole or in part with processor(s) 112 and/or other circuitry and/or modules or components of the aerial vehicle 100. In some embodiments, the data storage 114 can be implemented using a single physical device (e.g., one optical, magnetic, organic or other memory or disc storage unit), while in other embodiments, the data storage 114 can be implemented using two or more physical devices. Further, in addition to the computer-readable program instructions 116, the data storage 114 may include additional data such as diagnostic data, among other possibilities.

The aerial vehicle 100 may optionally include one or more additional sensor(s) 124, in addition to IMU 102, such as load sensors, position sensors, touch sensors, ultrasonic range sensors, infrared sensors, sonar, optical sensors, biosensors, force sensors, proximity sensors, Radio Frequency identification (RFID) sensors, Near Field Communication (NFC) sensors, wireless sensors, compasses, smoke sensors, light sensors, radio sensors, depth sensors (e.g., Red Green Blue plus Depth (RGB-D), lasers, structured-light, and/or a time-of-flight camera), microphones, speakers, radar, cameras (e.g., color cameras, grayscale cameras, and/or infrared cameras), and/or motion sensors (e.g., gyroscopes, accelerometers, inertial measurement units (IMU), and/or foot step or wheel odometry), among others. The additional sensor(s) 124 may provide sensor data to the processor(s) 112, and/or vehicle controller circuitry 108, to allow for appropriate interaction of the aerial vehicle 100 with the environment. In some embodiments, some of the sensor(s) 124 may additionally include alarms (e.g., speakers, flashing lights) configured to trigger and/or alert a pilot or operator.

Additionally, the aerial vehicle 100 may also include one or more power source(s) 120 configured to supply power to various components of the aerial vehicle 100. Any type of power source may be used such as, for example, a gasoline engine, an electric motor (e.g., a servomotor) and one or more batteries, or others.

Figure 2:
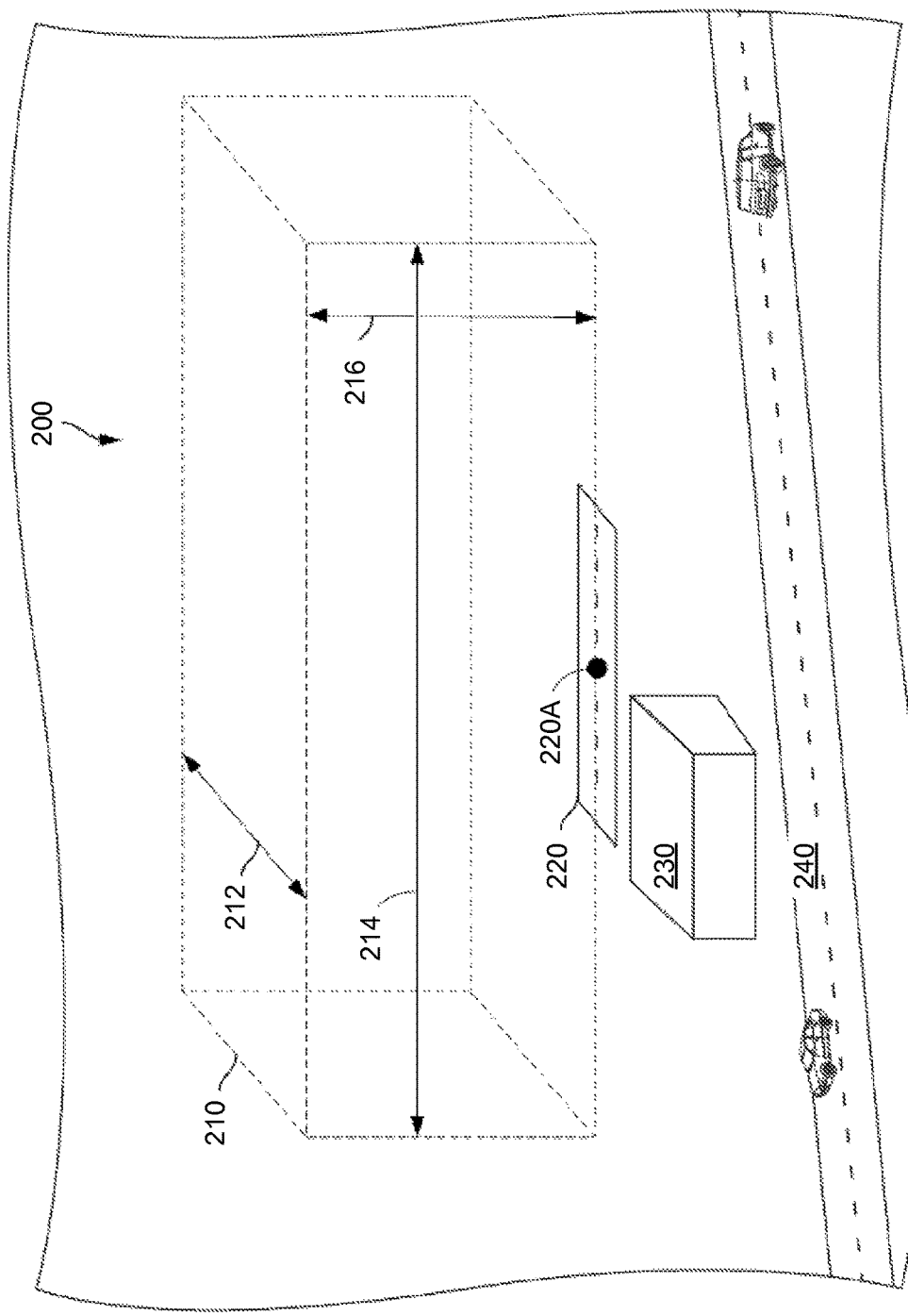
FIG. 2 illustrates a three-dimensional rectangular geo-fence, according to example embodiments.

FIG. 2 illustrates an example three-dimensional rectangular geo-fence in an illustrative flying environment 200, according to some example embodiments. The example rectangular geo-fence 210 has a fence width 212, a fence length 214, and a fence height 216. The illustrative flying environment 200 includes a runway 220, an initial location 220A, and various obstacles, such as hanger 230 and highway 240. Other embodiments may implement geo-fences having different geometrical configurations, e.g., squares, cones, spheres, irregular shapes (e.g., "L" shapes or other shapes) in different flying environments.

In some example implementations, it may be desirable to avoid obstacles in the nearby geographic area of the flying environment. For example, a flying club may have a hanger 230, be located next to a highway 240, be located next to property lines (not shown), and/or face other obstacles in the nearby vicinity (e.g., trees, moving or stationary structures, etc.). To minimize the risk of property damage or personal injury, rules or guidelines may prohibit operation of aerial vehicles near certain obstacles. For example, flying rules may only allow the aerial vehicles to fly along one side of the runway. As depicted in FIG. 2, the flying environment 200 is shown after the establishment of the rectangular geo-fence 210.

In operation in some embodiments, the rectangular geo-fence 210 may be set by first placing an aerial vehicle 100 at the edge of the runway 220 with its nose pointing perpendicular to the centerline (e.g., the long axis) of the runway. In FIG. 2, this runway centerline runs along the line denoted by reference numeral 214.

The aerial vehicle 100 (e.g., via the vehicle controller circuitry 108) may receive an indication to initialize a geo-fence. In some embodiments, the indication may be a signal from a transmitter or controller (e.g., controller 118 in FIG. 1) that is linked to the aerial vehicle, such as the depression of one or more buttons on the transmitter. The aerial vehicle may use a sensor (e.g., a GPS sensor) to determine the location of the aerial vehicle 100 and set an initial location, e.g., 3 meters in directly in front of that location at initial location 220A.

Although the runway centerline is described here as forming one of the reference bases for the geo-fence and the initial location 220A, some other reference base for the geo-fence could be used instead. For example, rather than the center line of the runway, the reference base for the geo-fence could instead be the inside edge of the runway such that the inner line of the geo-fence running along fence length 214 is aligned with the inside edge of the runway rather than the center of runway as depicted in FIG. 2. In such an embodiment, the initial location 220A is at a point that is some distance in front of the aerial vehicle (e.g., 3 meters or some other distance) and some distance inside the inner edge of the geo-fence (e.g., along the center line of the runway).

Based on the initial location 220A, the rest of the parameters of the geo-fence may be established by the vehicle controller circuitry 108. For example, the vehicle controller circuitry 108 may set a geo-fence width 212 of 200 meters away from the initial location 220A. Similarly, the vehicle controller circuitry 108 may set a geo-fence length 214 of 400 meters by setting a length to the left of initial location 220A of 200 meters (i.e., a left length) and a length to the right of initial location 220A of 200 meters (i.e., a right length). Although equal numbers are described for purposes of illustration, any numbers may be used. In embodiments where the geo-fence additionally includes a height, the vehicle controller circuitry 108 may also set the geo-fence height 216. The geo-fence height 216 may be set with a minimum height (i.e., a floor) and/or a maximum height (i.e., a ceiling). For example, a floor may be set at 10 meters and a ceiling may be set at 121 meters. However, the geo-fence height is not required in all embodiments.

The geo-fence parameters may also be adjustable or programmable. For example, input knobs, touch-screens, or other input controls of the controller 118 may be used to help set the parameters during the geo-fence initialization or after the geo-fence has been established. Although a rectangular geo-fence is described for purposes of illustration, other geo-fences may be used and still fall within this disclosure. For example, circular geo-fences, dodecahedral geo-fences, octagonal geo-fences, triangular geo-fences, or any other shape of geo-fence may be used.

The vehicle controller circuitry 108 (or other circuitry) may be further configured to determine a wind direction that is opposite of an initialization heading. For example, after the aerial vehicle 100 is placed at the edge of the runway 220 and the initialization point and geo-fence 210 have been established, the aerial vehicle 100 may be turned so that the nose is pointing into the wind. The vehicle controller circuitry 108 may receive data (e.g., angular data) from the IMU 102 indicating that the aerial vehicle 100 has turned in one direction and establish an initialization heading that is 90 degrees away from the orientation of the aerial vehicle 100 when it was placed on the edge of the runway. For example, if the aerial vehicle 100 is perpendicular to the edge of the runway (e.g., 90 degrees on a typical x-y coordinate system) and is turned (even slightly) to the left, the vehicle controller circuitry 108 may determine that the initialization heading is 180 degrees and the wind direction is going from left to right along the centerline of the runway 220 such that the wind heading is 0 degrees. Determining wind direction may be important for assisted landings or auto-landings in some embodiments, and this provides a novel way to determine the wind direction without the added cost and weight of an additional sensor.

In some implementations, the vehicle controller circuitry 108 (e.g., an RC receiver or vehicle controller circuitry) may set wind direction after a threshold value is reached. For example, after the geo-fence 210 has been established, the vehicle controller circuitry may look for a certain throttle value (e.g., 90% throttle) to be reached before setting wind direction. Once the threshold value is reached, the vehicle controller circuitry 108 may determine the initialization heading and wind direction by using plus or minus 90 degrees from the initial orientation of the aerial vehicle 100 when it was placed at the edge of the runway. The plus or minus is determined by the orientation of the aerial vehicle 100 when it hits the threshold value.

For example, if the aerial vehicle taxies onto the runway 220, turns to the left, and throttles up to a threshold value of 90%, the vehicle controller circuitry 108 will set the initialization heading to the left 90 degrees and the wind direction to the right 90 degrees from the initial orientation of the aerial vehicle 100. This provides an easy way to set the initialization heading and the wind direction in opposite directions directly along the center of the runway 220 without the headings being affected by the varying orientations and oscillations that may occur at takeoff. One of ordinary skill would understand that various implementations may be used to determine the wind direction in this manner and that nothing herein is intended to be limiting.

In some embodiments, the vehicle controller circuitry 108 monitors the location of the aerial vehicle 100 in relation to the geo-fence 210. If the vehicle controller circuitry 108 detects the aerial vehicle 100 is outside the geo-fence 210, the vehicle controller circuitry may perform an out-of-fence procedure, including but not limited to: (i) perform an auto-landing or assisted landing procedure, (ii) perform a return-to-home procedure, (iii) perform a loiter procedure, (iv) activate an alarm (e.g., an audible alarm at the controller 118), and/or (v) take another action.

An out-of-fence procedure (e.g., an auto-land procedure) may be accomplished by removing one or more control surfaces 106 from active control at the controller 118 (e.g., the throttle and rudder sticks at the transmitter may be disabled while the elevator or aileron commands may allow the pilot or operator to make course adjustments without taking over full control of the aerial vehicle 100). The vehicle controller circuitry 108 may use one or more control surfaces 106 to position the aerial vehicle 100 downwind (based on the previously set wind direction) of the runway 220 and perform a pre-set algorithm to land the aerial vehicle 100. Because each aerial vehicle has different characteristics and flight capabilities, different aerial vehicles may be configured to use different landing algorithms.

Generally, the auto-landing algorithm will set one or more control surfaces for certain periods of time at certain altitudes. For example, the vehicle controller circuitry 108 may engage the throttle at maximum power (e.g., by sending one or more throttle commands to the engine) and position the aerial vehicle at an altitude of 20 meters (e.g., by sending one or more control signals to one or more servomotors that are configured to control one or more control surfaces on the aerial vehicle). The vehicle controller circuitry 108 may then initiate a turn toward a GPS location downwind of the initial location 220A (e.g., 150 meters downwind). When the aerial vehicle 100 reaches the GPS location downwind of the initial location 220A, the vehicle controller circuitry 108 may reduce the power to 50% and establish a downward glide slope directly at the initial location 220A. When the aerial vehicle 100 reaches a second downwind location (e.g., 90 meters), the vehicle controller circuitry 108 will reduce the throttle to 25%. When the aerial vehicle 100 reaches a third downwind location (e.g., 60 meters), the vehicle controller circuitry 108 will reduce the power to 0%. When the aerial vehicles 100 reaches a minimum altitude (e.g., 2 meters), the vehicle controller circuitry 108 will establish a 15-degree nose up attitude and will maintain this state until the aerial vehicle lands.

In some embodiments, as a failsafe, if the aerial vehicle 100 passes the initial location 220A, the vehicle controller circuitry 108 will abort the auto-land procedure, increase throttle to the aerial vehicle 100 to regain altitude, and either re-try the landing procedure or take another action. In other embodiments, if the aerial vehicle 100 passes the initial location 220A, the aerial vehicle 100 to continue its decent on the glide slope, and use the IMU system to maintain attitude and heading, but ignore the initial GPS point and not turn back toward the initial GPS point. Thus, in such embodiments, the landing continues and the aerial vehicle may simply overshoot the initial GPS point to some degree.

During operation of return home or loiter mode or procedure, the vehicle controller circuitry 108 may control the aerial vehicle to maintain a defined altitude (e.g., 36 meters). For the return home procedure, the vehicle controller circuitry 108 uses a control surface 106 to initiate a turn of the aerial vehicle to orient the vehicle directly towards (or at least substantially directly towards) the initial location 220A. In some embodiments, the vehicle controller circuitry may return the aerial vehicle 100 at a maximum power setting until the aerial vehicle is within a certain distance (e.g., 18 meters) of the initial location 220A when a lower power setting (e.g., 50%) is used.

For loiter mode, the vehicle controller circuitry 108 may first use the return to home functionality. Once the initial location 220A is reached in loiter mode, the vehicle controller circuitry 108 may fly the aerial vehicle in a circular path around the initial location 220A until loiter mode is canceled (e.g., by a pilot depressing a button on controller 118).

In some embodiments, such as the rectangular geo-fence embodiment, the loiter area may be set around a location other than the initial location 220A to ensure the aerial vehicle 100 does not pass through the geo-fence. For example, the aerial vehicle may loiter around a loiter point that is halfway between the initial location 220A and the opposite edge of the geo-fence width 212.

Figure 3:
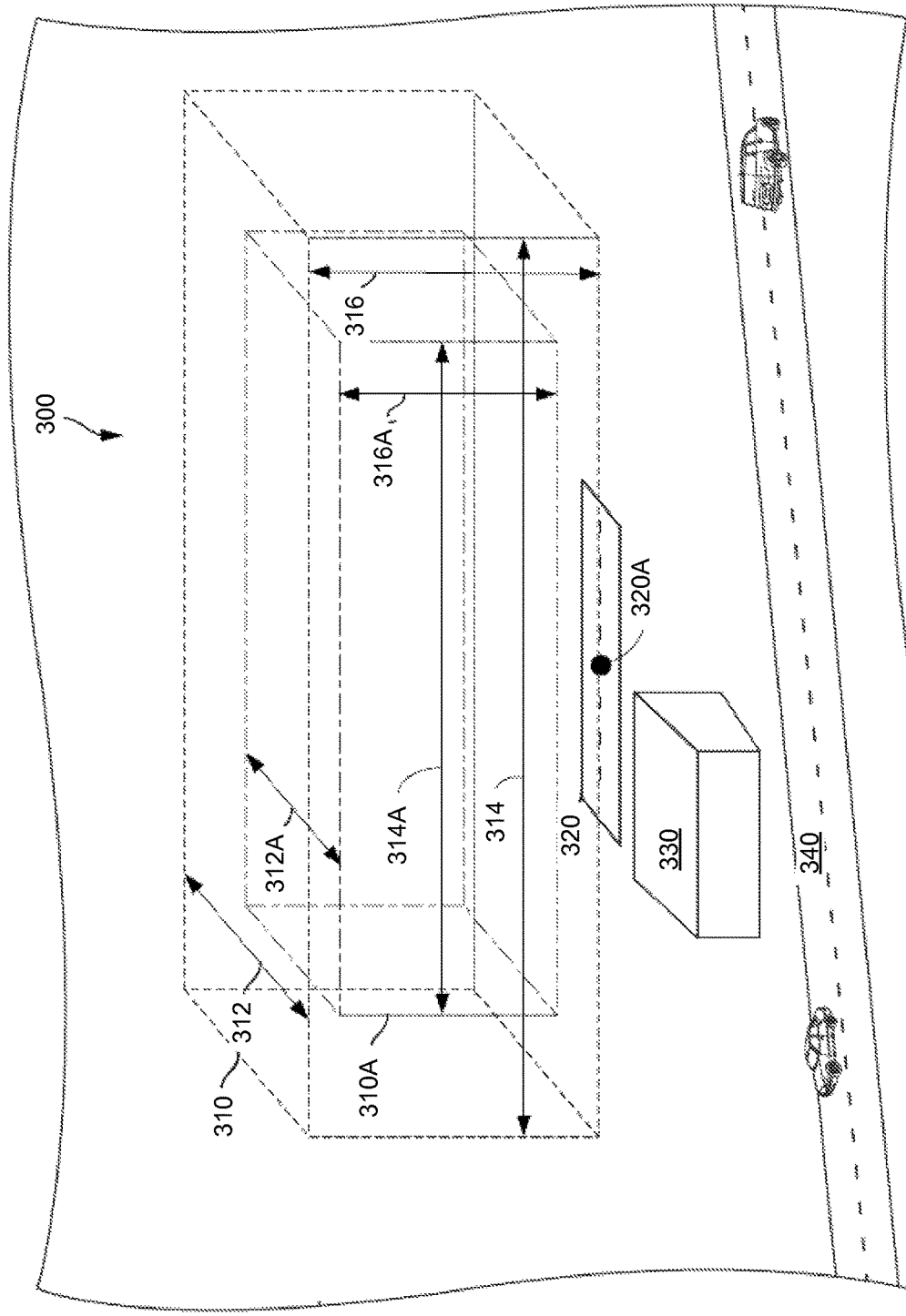
FIG. 3 illustrates a threshold safety distance within a three-dimensional rectangular geo-fence, according to some embodiments.

FIG. 3 illustrates a threshold safety distance geo-fence within a three-dimensional rectangular geo-fence in a flying environment 300, according to some embodiments. FIG. 3 illustrates a three-dimensional rectangular geo-fence 310 and a threshold safety distance geo-fence 310A. Flying environment 300 includes a rectangular geo-fence 310 with a fence width 312, a fence length 314, and a fence height 316. Flying environment 300 includes a threshold safety distance geo-fence with a safety fence width 312A, a safety fence length 314A, and a safety fence height 316A. Flying environment 300 also depicts a runway 320 and an initial location 320A, and various obstacles, such as hanger 330 and highway 340.

In operation in some embodiments, it may be critical that the aerial vehicle 100 does not ever travel outside of the geo-fence 310. In these cases, the aerial vehicle (e.g., via the vehicle controller circuitry 108) may monitor the location of the aerial vehicle 100 in relation to the geo-fence 310 and to a threshold safety distance geo-fence 310A (which may also be referred to as a safety geo-fence or first contact geo-fence). If the aerial vehicle is outside the threshold safety distance geo-fence 310A (i.e., within a certain proximity to the geo-fence 210) or within a certain range (e.g., 5 meters) of the safety geo-fence, the vehicle controller circuitry may: (i) perform an auto-landing or assisted landing procedure, (ii) perform a return-to-home procedure, (iii) perform a loiter procedure, (iv) activate an alarm (e.g., an audible alarm at the controller 118), and/or (v) take another action to ensure the aerial vehicle does not exceed the boundaries of the geo-fence 310.

The parameters of the safety geo-fence (e.g., threshold safety distance geo-fence 310A) may be established by the vehicle controller circuitry 108 or may be programmable. For example, the vehicle controller circuitry 108 may set a geo-fence width 312 of 200 meters away from the initial location 320A and a safety fence width 312A of 160 meters that is centered within the geo-fence width 312 (e.g., safety fence width 312A begins at 20 meters past 320A and ends at 180 meters past 320A). Similarly, the vehicle controller circuitry 108 may set a geo-fence length 314 of 400 meters by setting a length to the left of initial location 320A of 200 meters (i.e., a left length) and a length to the right of initial location 320A of 200 meters (i.e., a right length). The vehicle controller circuitry 108 may also set a safety fence length 314A of 160 meters in a similar manner. Although equal numbers are described for purposes of illustration, any numbers may be used. The vehicle controller circuitry 108 may also set a geo-fence height 316 and a safety fence height 316A. Each fence height may include a minimum height (i.e., a floor) or a maximum height (i.e., a ceiling). For example, a floor may be set at 10 meters (or 0 meters) and a ceiling may be set at 121 meters.

The geo-fence parameters may also be adjustable or programmable. For example, input knobs, touch-screens, or other input controls of the controller 118 may be used to help set the parameters during the geo-fence initialization or after the geo-fence has been established. Although a rectangular geo-fence is described for purposes of illustration, other geo-fences may be used and still fall within this disclosure. For example, circular geo-fences, dodecahedral geo-fences, octagonal geo-fences, triangular geo-fences, or any other type of geo-fence may be used.

III. Illustrative Methods

Figure 4:
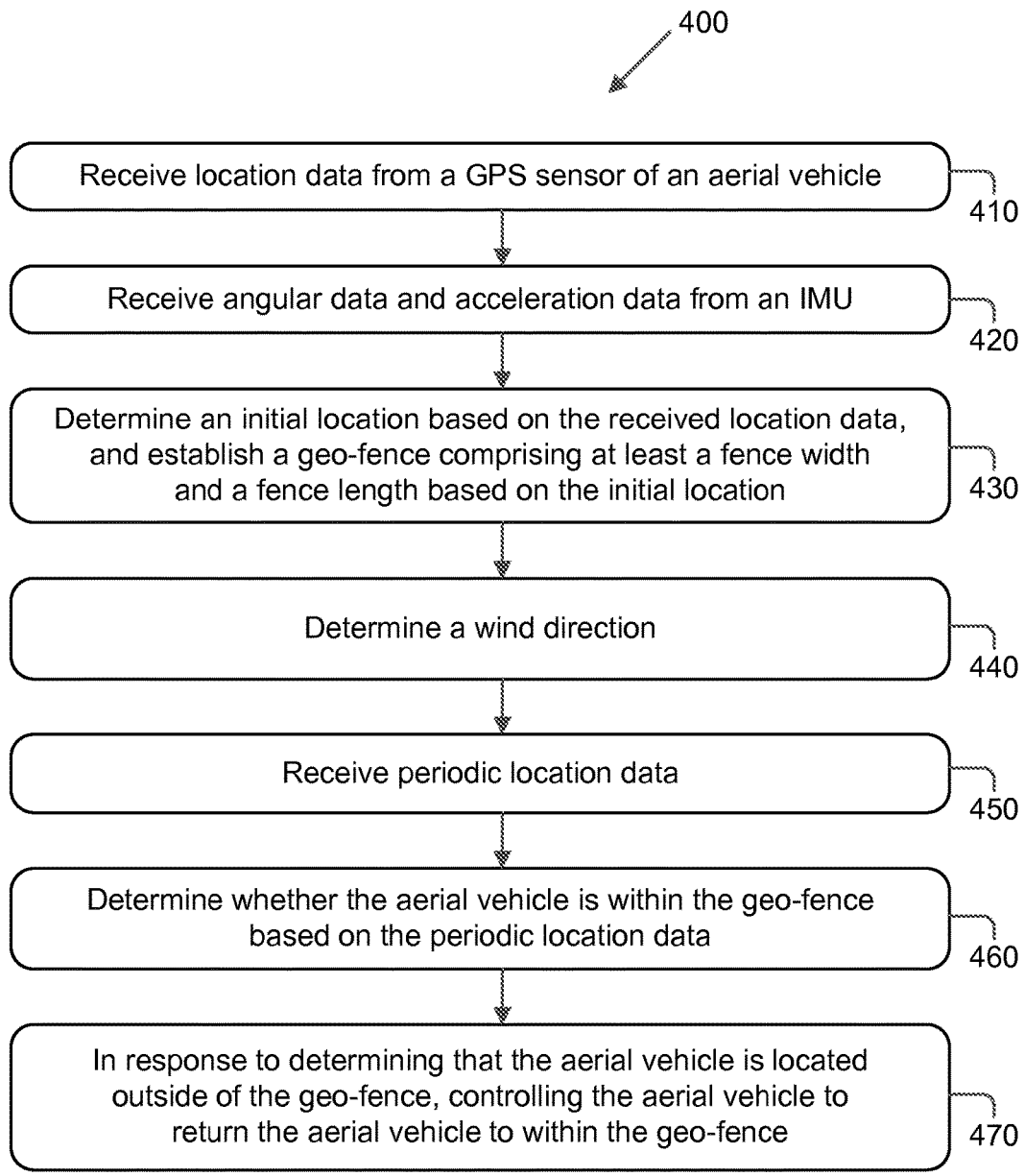
FIG. 4 is an example flowchart for establishing a geo-fence, according to some embodiments.

FIG. 4 is an example flowchart for a method 400 for establishing a geo-fence, according to some embodiments. In some embodiments, method 400 may be implemented by one or more processors and non-transitory computer-readable media having instructions that are executable to cause the device to perform functions described herein. Method 400 and other processes and methods disclosed herein may include one or more operations, functions, or actions as illustrated by one or more of blocks 410-470. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 400 and other processes and methods disclosed herein, the flowchart shows functionality and operation of one possible implementation of the disclosed embodiments. In this regard, each block may represent a module, a segment, or a portion of program code, which includes one or more instructions executable by a processor for implementing specific logical functions or steps in the process. The program code may be stored on any type of computer readable medium, for example, such as any of the computer readable media disclosed herein. The computer readable media may include non-transitory computer readable media, for example, such as computer-readable media that stores data for short periods of time like register memory, processor cache and Random Access Memory (RAM). The computer readable media may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable media may be considered a computer readable storage media, for example, or a tangible storage device. In addition, for the method 400 and other processes and methods disclosed herein, each block in FIG. 4 may represent circuitry that is wired to perform the specific logical functions in the process.

At block 410, method 400 includes receiving location data from a GPS sensor of an aerial vehicle. This location data may be received, e.g., by vehicle controller circuitry 108 (such as a receiver or a flight stabilization component) of an aerial vehicle 100.

At block 420, method 400 includes receiving angular data and acceleration data from an inertial measurement unit. This angular data and acceleration data may be received, e.g., by vehicle controller circuitry 108 of an aerial vehicle 100. Other data may also be received, such as geomagnetic data from one or more magnetometers, pressure data from a barometer, or other sensor data.

For embodiments where the GPS sensor(s) and/or IMU sensor(s) are integrated with the vehicle controller circuitry 108, method blocks 410 and 420 may alternatively include determining GPS location data and determining angular and acceleration data, respectively, rather than receiving such data from separate sensors.

At block 430, method 400 includes establishing, by vehicle controller circuitry 108, an initial location (such as initial location 220A) based on the location data received or determined at block 410. Block 430 also includes establishing, by vehicle controller circuitry, a rectangular geo-fence comprising a minimum fence height, a maximum fence height, a fence width, and a fence length. In some embodiments, block 430 may alternatively include establishing a geo-fence having a shape that is different than a rectangle, including but not limited to any of the other shaped geo-fence configures disclosed herein.

At block 440, method 400 includes determining, by vehicle controller circuitry, a wind direction (and/or an initialization heading) based on at least one or more of angular data from an IMU sensor, acceleration data from the IMU sensor, location data from a GPS sensor, and/or other data (such as control surface values like a throttle percentage).

At block 450, method 400 includes receiving, by the vehicle controller circuitry, periodic location data. This location data may be updated at random times or at a set frequency. In embodiments where GPS sensors are integrated with the vehicle controller circuitry, block 450 may alternatively include periodically or at least semi-periodically determining the location data (rather than periodically or at least semi-periodically receiving location data from one or more external GPS sensors).

At block 460, method 400 includes determining whether the aerial vehicle is located within the geo-fence based on the location data from block 450. This may be accomplished by comparing the most current location data from block 450 to the established geo-fence configuration.

At block 470, method 400 includes, in response to determining that the aerial vehicle is located outside of the geo-fence, controlling the aerial vehicle to return the aerial vehicle to within the geo-fence by, for example, controlling one or more control surfaces of the aerial vehicle to fly the aerial vehicle to a position inside of the geo-fence. Additionally or alternatively, in response to determining that the aerial vehicle is located outside the geo-fence (or that the aerial vehicle is within a threshold safety distance from the geo-fence), the vehicle controller circuitry may control the aerial vehicle to auto-land, return to home, loiter, activate an alarm, or take another action to reduce the time that the aerial vehicle is outside of the geo-fence and/or reduce the extent to which the aerial vehicle has strayed outside of the geo-fence.

V. Conclusion

The present disclosure is not to be limited in terms of the particular example implementations described in this application, which are intended as illustrations of various aspects of the disclosed systems and methods. Many modifications and variations can be made without departing from the spirit and scope of the disclosed systems and methods, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example implementations described herein and in the figures are not meant to be limiting. Other implementations can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The particular arrangements shown in the figures should not be viewed as limiting. It should be understood that other implementations can include more or less of each element shown in a given figure. Further, some of the illustrated elements can be combined or omitted. Yet further, an example implementation can include elements that are not illustrated in the figures.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims.

We claim:

1. An aerial vehicle comprising:
   an inertial measurement unit (IMU) comprising:
      at least one gyroscope sensor configured to output angular data; and
      at least one accelerometer sensor configured to output acceleration data;
   a global positioning system (GPS) sensor configured to output location data; and
   vehicle controller circuitry electrically connected to the IMU and the GPS sensor and configured to:
      determine a wind direction based on (i) the location data from the GPS sensor and (ii) either the angular data or the acceleration data from the IMU; and
      determine an initial location based on the location data from the GPS sensor and establish a geo-fence based on the initial location.

2. The aerial vehicle of claim 1, wherein the geo-fence is a rectangular geo-fence and the vehicle controller circuitry is further configured to establish at least a geo-fence width and a geo-fence length.

3. The aerial vehicle of claim 2, wherein the geo-fence length comprises a left length and a right length, wherein the left length and right length are measured relative to the initial location and are adjustable.

4. The aerial vehicle of claim 1, wherein the vehicle controller circuitry is further configured to:
   determine whether the aerial vehicle is located within the geo-fence based on one or more of the angular data, acceleration data, and location data; and
   in response to determining the aerial vehicle is located outside the geo-fence, send a control signal to control at least one control surface of the aerial vehicle.

5. The aerial vehicle of claim 1, wherein the vehicle controller circuitry is further configured to:
   determine a current location of the aerial vehicle within the geo-fence based on one or more of the angular data, acceleration data, and location data;
   set a threshold safety distance geo-fence within the geo-fence;
   compare the current location to the threshold safety distance geo-fence; and
   when the current location is outside the threshold safety distance geo-fence, control the aerial vehicle to stay within the geo-fence.

6. A method of establishing a geo-fence for an aerial vehicle comprising:
   determining a first location of the aerial vehicle based on location data from a global positioning system (GPS) sensor of the aerial vehicle;
   determining angular data and acceleration data from an inertial measurement unit (IMU);
   establishing an initial location based on the first location;
   establishing the geo-fence comprising at least a fence width and a fence length;
   determining a wind direction based on (i) the location data from the GPS sensor, and (ii) one or both of the angular data or the acceleration data from the IMU.

7. The method of claim 6, wherein the fence length further comprises a left length and a right length and wherein the left length and the right length are measured from the initial location and are adjustable.

8. The method of claim 6, further comprising:
   determining whether the aerial vehicle is located within the geo-fence based on one or more of the angular data, acceleration data, and location data; and
   in response to determining the aerial vehicle is located outside the geo-fence, sending a control signal to at least one control surface of the aerial vehicle.

9. The method of claim 6, further comprising:
   determining a current location of the aerial vehicle within the geo-fence based on one or more of the angular data, acceleration data, and location data;
   establishing a threshold safety distance geo-fence within the geo-fence;
   comparing the current location to the threshold safety distance geo-fence; and
   when the current location is outside the threshold safety distance geo-fence, controlling the aerial vehicle to stay within the geo-fence.

10. An aerial vehicle comprising:
    an inertial measurement unit (IMU) comprising:
       at least one gyroscope sensor configured to output angular data; and
       at least one accelerometer sensor configured to output acceleration data;
    a global positioning system (GPS) sensor configured to output location data;
    vehicle controller circuitry electrically connected to the IMU and the GPS sensor and configured to:
       receive the angular data, the acceleration data, and the location data;
       receive a throttle command from a controller;
       determine an initial location based on received location data;
       establish a geo-fence based on the initial location; and
       determine a wind direction based on the received throttle command.

11. The aerial vehicle of claim 10, wherein the geo-fence is a rectangular geo-fence and the vehicle controller circuitry is further configured to establish a minimum fence height, a maximum fence height, a fence width, and a fence length.

12. The aerial vehicle of claim 11, wherein the fence length comprises a left length and a right length, wherein the left length and right length are measured from the initial location and are adjustable.

13. The aerial vehicle of claim 10, wherein the vehicle controller circuitry is further configured to:
    determine whether the aerial vehicle is located within the geo-fence based on one or more of the received angular data, acceleration data, and location data; and
    in response to determining the aerial vehicle is located outside the geo-fence, controlling the aerial vehicle to return to a location within the geo-fence.

14. The aerial vehicle of claim 10, wherein the vehicle controller circuitry is further configured to:
  determine whether the aerial vehicle is located within the geo-fence based on one or more of the received angular data, acceleration data, and location data; and
  in response to determining the aerial vehicle is located outside the geo-fence, control the aerial vehicle to perform an out-of-fence procedure.

15. The aerial vehicle of claim 14, wherein the out-of-fence procedure is an auto-land procedure.

16. The aerial vehicle of claim 14, wherein the out-of-fence procedure is a return home procedure.

17. The aerial vehicle of claim 14, where in the out-of-fence procedure is a loiter procedure.

18. The aerial vehicle of claim 10, wherein the vehicle controller circuitry is further configured to:
  determine a current location of the aerial vehicle within the geo-fence based on one or more of the received angular data, acceleration data, and location data;
  set a threshold safety distance geo-fence within the geo-fence;
  compare the current location to the threshold safety distance geo-fence; and
  when the current location is outside the threshold safety distance geo-fence, control the aerial vehicle to stay within the geo-fence.

19. The aerial vehicle of claim 10, wherein the vehicle controller circuitry is further configured to:
  determine whether the aerial vehicle is located within the geo-fence based on one or more of the received angular data, received data, and location data; and
  in response to determining the aerial vehicle is located outside the geo-fence, activate an alarm.

* * * * *